Nov. 25, 1952  C. O. FORBES  2,619,050

TAMALE MOLD

Filed Oct. 27, 1950

INVENTOR.
CHARLES O. FORBES,
BY
McMorrow, Berman & Davidson
ATTORNEYS.

UNITED STATES PATENT OFFICE 2,619,050

TAMALE MOLD

Charles O. Forbes, Bremerton, Wash.

Application October 27, 1950, Serial No. 192,572

2 Claims. (Cl. 107—19)

This invention relates to molds for use in the preparation of articles of food and more particularly to a mold for preparing food articles, such as tamales, having an outer shell of one material and a core or filling of a different material.

It is among the objects of the invention to provide an improved mold for preparing articles of food which mold is effective to provide a hollow, elongated shell of highly plastic material, such as corn meal mush, and to hold the material in shape while it is chilled or frozen to a condition of sufficient durability to permit removal of the article from the mold and subsequent wrapping of the article, which permits the frozen shell to be filled with a core or filler of a different material while the shell is held in the mold and to be again chilled or frozen, which is easy to operate and permits removal of the mold core from a formed and frozen shell without collapsing or damaging the shell, and which is simple and durable in construction, economical to manufacture, and efficient and effective in use.

Other objects and advantages will become apparent from a consideration of the following description and the appended claims in conjunction with the accompanying drawing wherein:

Figure 1:
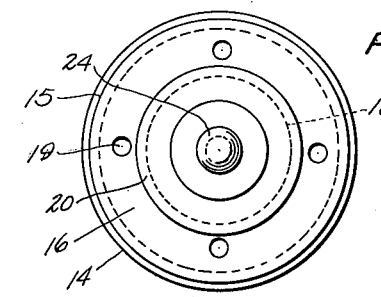
Figure 1 is a top plan view of a mold illustrative of the invention.
Figure 4:
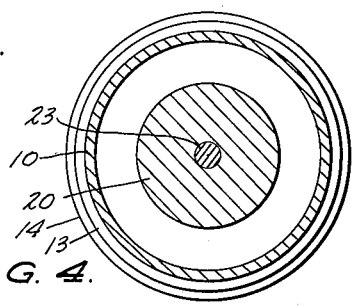
Figure 4 is a transverse cross sectional view on the line 4—4 of Figure 3.
Figure 2:
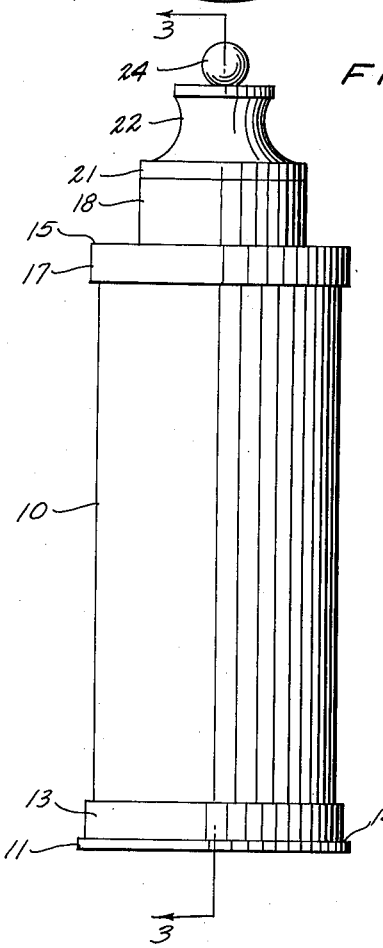
Figure 2 is a side elevational view of the mold illustrated in Figure 1.
Figure 3:
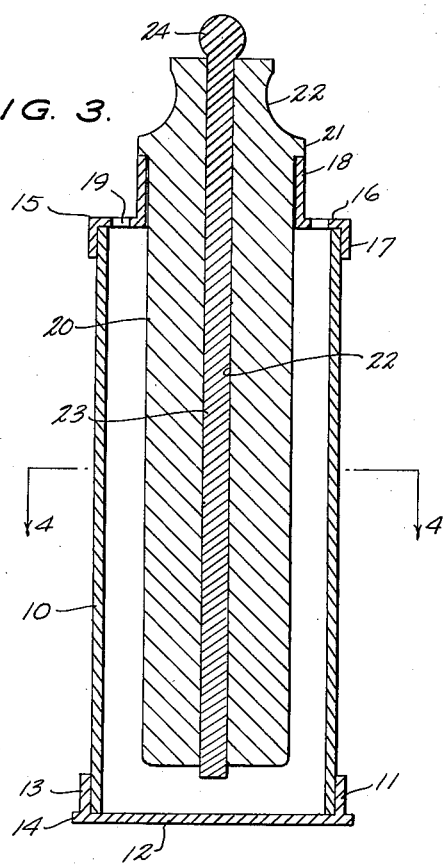
Figure 3 is a longitudinal cross sectional view on the line 3—3 of Figure 2.

With continued reference to the drawing, the mold comprises an elongated tubular body 10 which is preferably, though not necessarily of cylindrical shape, having its ends cut substantially perpendicular to its longitudinal center line.

A cap 11 closes one end of the body 10 and comprises a circular disc 12 of suitable sheet material and an annular flange 13 secured on one side of the disc 12 and extending perpendicularly therefrom. The flange 13 slidably receives the associated end portion of the body 10 and frictionally retains the cap on the body. The disc 12 preferably projects marginally beyond the flange 13 to provide an annular bead 14 which provides a convenient finger grip for removing the closure cap from the body.

A second closure cap 15 closes the other end of the body 10 and includes an annular member 16 of suitable sheet material, an annular flange 17 secured to the member 16 at the outer edge of the latter and projecting perpendicularly from one side of this member an axial tubular boss extends outwardly from the edge of the opening of the member 16.

The flange 17 slidably receives the associated end of the body 10 and frictionally holds the cap 15 on the body. Between the flange 17 and the boss 18 the member 16 is provided with an annular series of spaced apart apertures 19 for a purpose which will presently appear.

A preferably solid core 20 preferably in the form of an elongated body of cylindrical shape, has a diameter substantially the same as the inside diameter of the boss 18 and a length slightly greater than the length of the body 10. This core 20 is slidably received in the boss 18 and extends into the interior of the body 10 from the boss 18 to a location adjacent the disc 12 of the closure cap 11. Near one end the core is provided with an annular bead 21 which provides a shoulder adapted to engage the distal end of the boss 18 to limit movement of the core through this boss. Adjacent to the bead 21 the core is provided with an annular groove 22 providing a handle portion on the end of the core projecting out of the body 10 and the boss 18 for removing the core from the body by sliding it outwardly through the boss 18.

The boss 18 is substantially coaxial with the longitudinal center line of the body 10 so that the core 10 is circumspatially disposed in the body 10 when inserted through the boss 18 and into the body.

The core 20 is provided with a longitudinally extending axial bore 22 and an elongated pin 23 is slidably received in and closes this bore. The pin 23 is slightly longer than the core 20 and has on one end a knob 24 providing a convenient handle for withdrawing the pin from the bore.

In using the mold to make food articles, such as tamales, the cap 11 is placed on one end of the body 10 and a quantity of shell material, such as corn metal mush, is placed in the body 10, this quantity being insufficient to fill the body. The cap 15 is then placed on the other end of the body and the core 20 with the pin 23 inserted therethrough is slid through the boss 18 and into the body 10. As the core 20 is forced into this body it will displace the shell material and cause this material to completely fill all of the space between the core and the body, any excess material escaping through the apertures 19 in the cap 15. The pin 23 is then removed from the core and the mold with the material therein placed in a suitable freezer, such as a deep freeze cabinet, and the material frozen.

The core 20 may then be removed from the formed shell in the body 10 by pulling the core outwardly through the boss 18. The cap 15 is then removed and the interior of the shell filled with a suitable filling material after which a quantity of shell material can be placed in the end of the body normally covered by the cap 15 to close this end of the shell, the opposite end of the shell being closed by the space provided between the cap 11 and the adjacent end of the core 20 when the core is fully inserted into the body 10.

The mold with the material therein is then returned to the freezer and the material is frozen or chilled to a firm condition. The tamale may then be removed from the mold, wrapped if desired, and returned to the freezer for storage in a frozen condition until required for use.

When required for use, the frozen tamales are removed from the freezer and steamed or cooked in some other desired manner.

If desired, a number of mold bodies 10 may be provided for each cap, core and pin assembly so that the food articles may be cooked directly in the mold bodies.

The body 10 and the caps 11 and 15 are preferably formed of a suitable metallic material, such as aluminum, and the core 20 is preferably formed of a suitable material, such as wood. The pin 23 may be formed of either wood or metal, as may be desired. The materials mentioned are explanatory rather than restricted as the entire device may be made of other suitable materials, such as synthetic resin plastic, if such other materials are found more suitable for particular operating conditions.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a food mold, a tubular body, closure means closing one end of said body, a removable cap closing the other end of the body, said cap being formed with a central opening, a tubular boss on said cap surrounding said opening at the edge thereof and extending axially outwardly from said cap, a cylindrical core slidably engaged through said tubular boss and adapted to be extended into the interior of said tubular body with an end thereof in spaced proximity to said closure means, the space between the side of said core and the side wall of the body and between the said end of the core and said closure means being arranged to accommodate food, said core being formed with an axial bore extending therethrough, and a pin longer than said core and slidably and removably engaged in said bore.

2. In a food mold, a tubular body, closure means closing one end of said body, a removable cap closing the other end of the body, said cap being formed with a central opening, a tubular boss on said cap surrounding said opening at the edge thereof and extending axially outwardly from said cap, a cylindrical core slidably engaged through said tubular boss and adapted to be extended into the interior of said tubular body with an end thereof in spaced proximity to said closure means, the space between the side of said core and the side wall of the body and between the said end of the core and said closure means being arranged to accommodate food, said core being formed with an axial bore extending therethrough, and a pin longer than said core and slidably and removably engaged in said bore, the opposite end of said core being formed with a shoulder arranged to engage the axially outward end of said tubular boss for limiting extension of the core into said body.

CHARLES O. FORBES.

REFERENCES CITED

The following references are of record in the file of this patent:

UNITED STATES PATENTS

| Number | Name | Date |
|---|---|---|
| 1,719,931 | Hall | July 9, 1929 |
| 2,307,133 | Moore | Jan. 26, 1943 |
| 2,384,041 | Moore | Sept. 4, 1945 |
| 2,534,059 | Ricciardi | Dec. 12, 1950 |